United States Patent
Yoshimatsu et al.

(10) Patent No.: US 10,612,280 B2
(45) Date of Patent: Apr. 7, 2020

(54) INSIDE DOOR HANDLE STRUCTURE

(71) Applicant: TOYOTA JIDOSHA KABUSHIKI KAISHA, Toyota-shi, Aichi-ken (JP)

(72) Inventors: Junichi Yoshimatsu, Nisshin (JP); Yuji Kariya, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 324 days.

(21) Appl. No.: 15/703,441

(22) Filed: Sep. 13, 2017

(65) Prior Publication Data

US 2018/0112446 A1    Apr. 26, 2018

(30) Foreign Application Priority Data

Oct. 20, 2016  (JP) ................. 2016-206311

(51) Int. Cl.
| | |
|---|---|
| *E05B 85/12* | (2014.01) |
| *B60N 2/75* | (2018.01) |
| *B60R 13/02* | (2006.01) |
| *E05B 85/16* | (2014.01) |
| *E05B 85/10* | (2014.01) |
| *E05B 79/06* | (2014.01) |

(52) U.S. Cl.
CPC ................ *E05B 85/12* (2013.01); *B60N 2/78* (2018.02); *B60R 13/0243* (2013.01); *E05B 85/16* (2013.01); *E05B 79/06* (2013.01); *E05B 85/10* (2013.01); *Y10T 292/57* (2015.04)

(58) Field of Classification Search
CPC ....... Y10T 292/57; E05B 85/12; E05B 85/16; E05B 79/06; E05B 85/10; B60N 2/78; B60R 13/0243

USPC .... 292/DIG. 30, DIG. 31, DIG. 50, DIG. 54, 292/DIG. 63
See application file for complete search history.

(56) References Cited

U.S. PATENT DOCUMENTS

| | | | | |
|---|---|---|---|---|
| 3,993,338 A | * | 11/1976 | Cherbourg | ................. B60J 5/06 292/336.3 |
| 3,993,339 A | * | 11/1976 | Cherbourg | ................ E05B 5/00 292/336.3 |
| 5,039,145 A | * | 8/1991 | Frye | ........................ E05B 85/12 292/143 |

(Continued)

FOREIGN PATENT DOCUMENTS

| | | |
|---|---|---|
| JP | H07-257185 A | 10/1995 |
| JP | H09-086174 A | 3/1997 |

(Continued)

*Primary Examiner* — Carlos Lugo
*Assistant Examiner* — Faria F Ahmad
(74) *Attorney, Agent, or Firm* — Oliff PLC

(57) ABSTRACT

An inside door handle structure according to technology of the present disclosure includes: an opening recess formed in a recessed shape in an armrest of a door trim at a side door of a vehicle, the opening recess opening toward a vehicle upper side, and a part of the armrest acting as a door gripping section when fingers are inserted into the opening recess in a case in which the side door is opened or closed; and an inside door handle provided in the door trim at the vehicle upper side of the opening recess, an end section of the inside door handle at a vehicle front side being configured as a rotational fulcrum, and the inside door handle releasing a door lock of the side door.

3 Claims, 4 Drawing Sheets

(56) References Cited

U.S. PATENT DOCUMENTS

| | | | | |
|---|---|---|---|---|
| 6,427,502 B1* | 8/2002 | Zagoroff | B62D 33/037 | 292/336.3 |
| 7,204,530 B2* | 4/2007 | Lee | E05B 85/12 | 292/336.3 |
| 9,551,166 B2* | 1/2017 | Patel | E05B 47/0657 | |
| 2001/0045752 A1* | 11/2001 | Predd | E05B 13/002 | 292/336.3 |
| 2003/0052490 A1* | 3/2003 | Willats | E05B 81/76 | 292/216 |
| 2004/0177478 A1* | 9/2004 | Louvel | E05B 81/78 | 16/430 |
| 2005/0230982 A1* | 10/2005 | Lee | E05B 85/12 | 292/336.3 |
| 2006/0208508 A1* | 9/2006 | Lucas | E05B 13/002 | 292/336.3 |
| 2007/0069531 A1* | 3/2007 | Herbert | E05B 85/107 | 292/336.3 |
| 2008/0073919 A1* | 3/2008 | Soda | E05B 41/00 | 292/336.3 |
| 2009/0127875 A1* | 5/2009 | Steelman | E05B 85/12 | 292/336.3 |
| 2009/0205383 A1* | 8/2009 | Katagiri | E05B 17/18 | 70/237 |
| 2010/0133858 A1* | 6/2010 | Huck | B60R 5/04 | 292/336.3 |
| 2011/0101709 A1* | 5/2011 | Katsumata | E05B 81/14 | 292/201 |
| 2012/0248798 A1* | 10/2012 | Wellborn, Sr. | E05B 85/12 | 292/336.3 |
| 2012/0280520 A1* | 11/2012 | Wellborn, Sr. | E05B 81/04 | 292/336.3 |
| 2015/0020460 A1* | 1/2015 | Collado | E05B 79/06 | 49/504 |
| 2015/0224858 A1* | 8/2015 | Yoshimoto | B60J 5/0434 | 292/336.3 |
| 2015/0225979 A1* | 8/2015 | Garofoli | E05B 63/042 | 292/336.3 |
| 2015/0315812 A1* | 11/2015 | Vasi | E05B 5/006 | 292/336.3 |
| 2015/0330113 A1* | 11/2015 | Van Wiemeersch | E05B 77/26 | 292/336.3 |
| 2017/0306666 A1* | 10/2017 | Kunimatsu | B60J 5/0413 | |
| 2018/0222293 A1* | 8/2018 | Thomas | E05B 83/28 | |
| 2019/0001903 A1* | 1/2019 | Ikechi | B60R 13/02 | |
| 2019/0016199 A1* | 1/2019 | Bowman | B60J 5/0416 | |
| 2019/0040658 A1* | 2/2019 | Suzuki | E05B 85/12 | |
| 2019/0077324 A1* | 3/2019 | Dunham | B60R 7/046 | |
| 2019/0078359 A1* | 3/2019 | Zhang | E05B 81/77 | |
| 2019/0169892 A1* | 6/2019 | Min | E05B 85/12 | |
| 2019/0255920 A1* | 8/2019 | Bowman | B60J 5/0416 | |
| 2019/0275961 A1* | 9/2019 | Del Pozo Gonzalez | B60R 7/081 | |

FOREIGN PATENT DOCUMENTS

| | | |
|---|---|---|
| JP | 2015-120478 A | 7/2015 |
| JP | 2016-151098 A | 8/2016 |

* cited by examiner

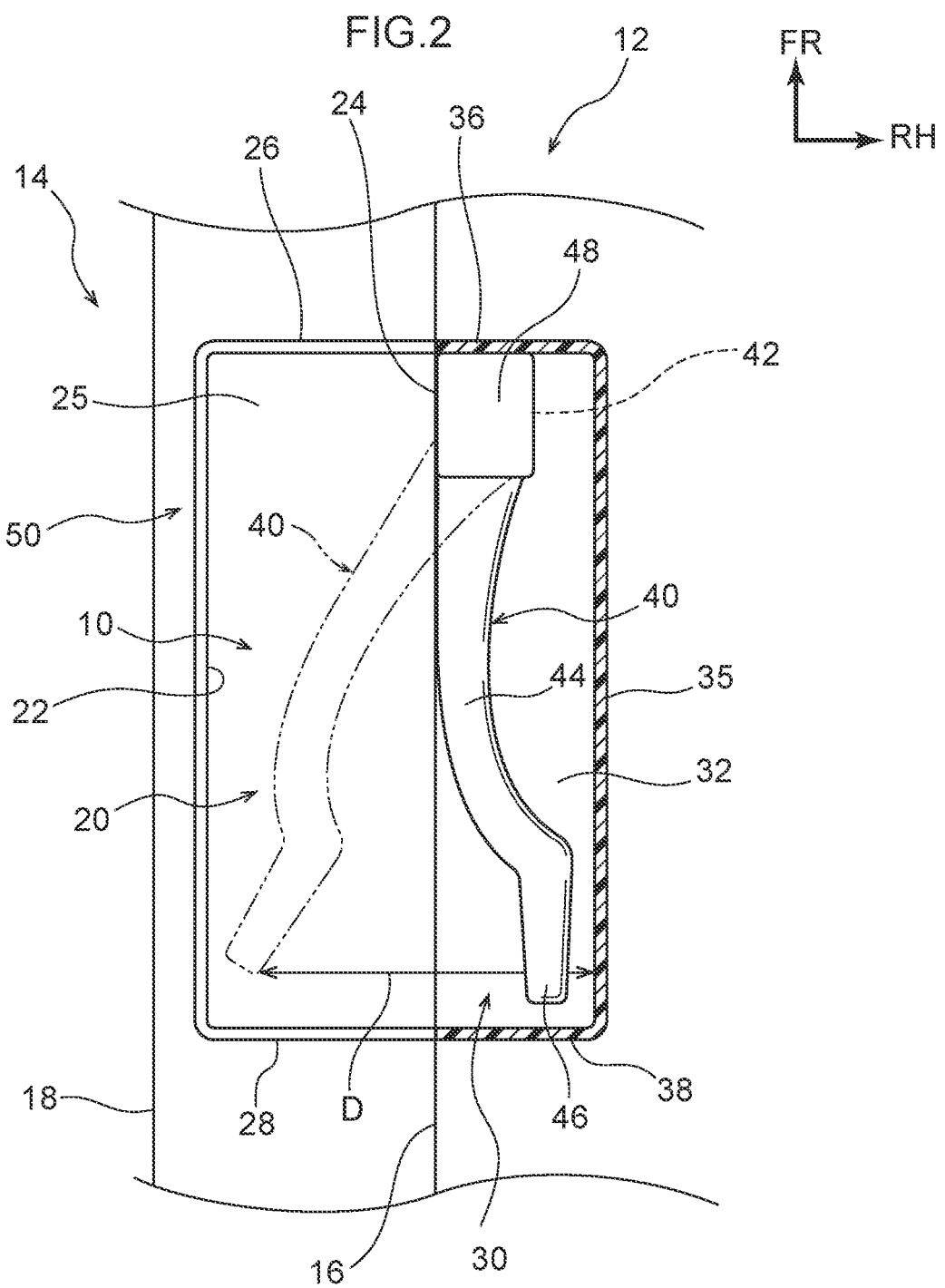

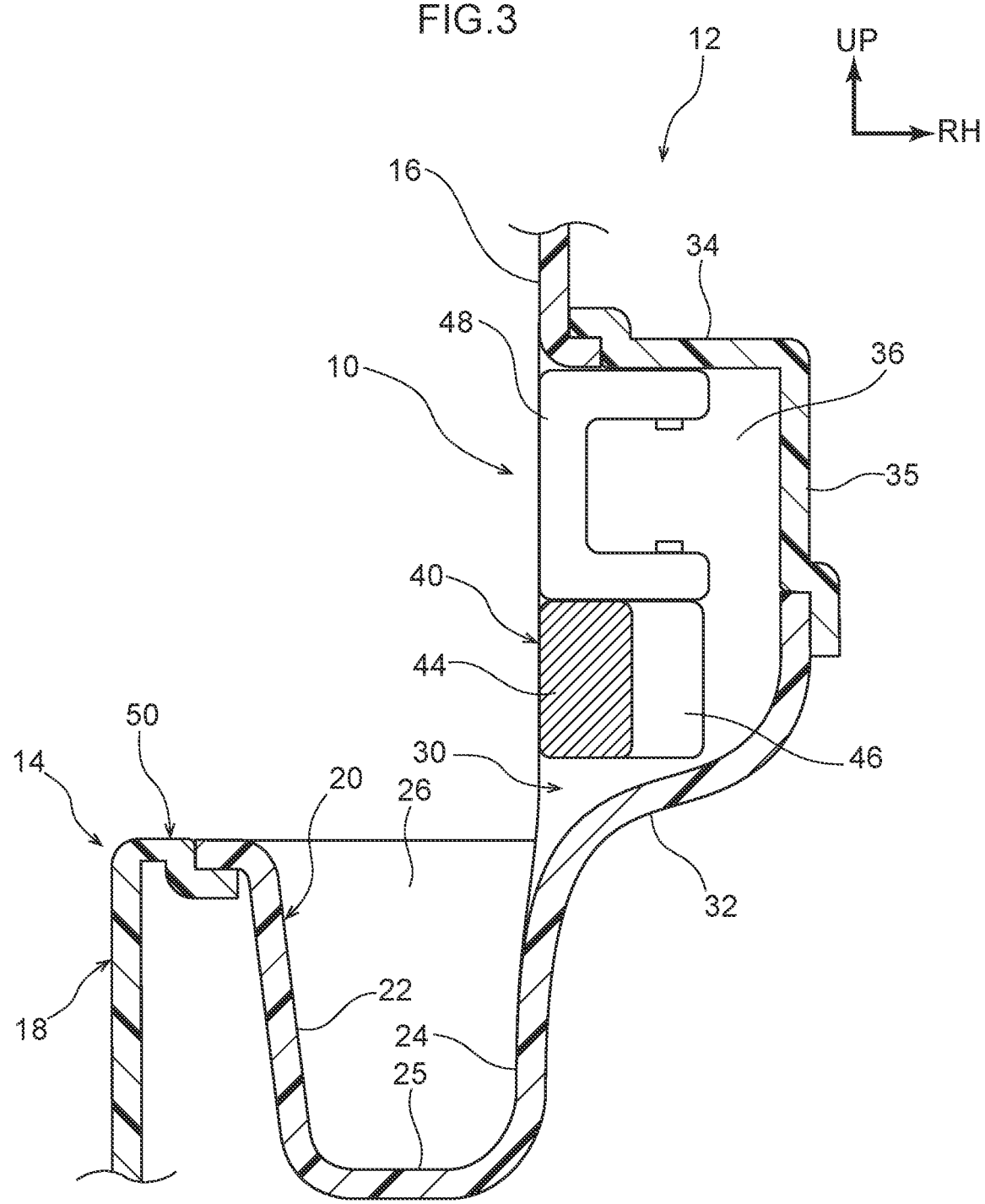

INSIDE DOOR HANDLE STRUCTURE

CROSS-REFERENCE TO RELATED APPLICATION

This application claims priority under 35 USC 119 from Japanese Patent Application No. 2016-206311 filed Oct. 20, 2016, the disclosure of which is incorporated by reference herein.

BACKGROUND

Technical Field

Technology of the present disclosure relates to an inside door handle structure.

Related Art

A structure in which an inside door handle and a door gripping section are disposed separately in a door trim of a side door, and a rotational axis of the inside door handle is set on a vehicle rear side, is conventionally known (refer to, for example, Japanese Patent Application Laid-Open Publication No. H7-257185).

SUMMARY

In the case of an inside door handle having such a structure, an occupant, after having pulled the inside door handle by their fingers to release a door lock, moves their fingers to a vehicle upper side to remove their fingers from the inside door handle, and then grips the door gripping section provided on a vehicle lower side of the inside door handle with their fingers to open the side door.

Incidentally, in order to prevent the side door from opening unexpectedly and suddenly due to a strong wind or gravity in a case in which the occupant gets out of a vehicle during a strong wind or in a case in which the occupant gets out of a vehicle that has been stopped on a downslope, for example, the occupant must grip the door gripping section with their fingers immediately after having pulled the inside door handle with their fingers to release the door lock.

However, in the above-described kind of structure, because the occupant must move their fingers to a vehicle upper side after having pulled the inside door handle with their fingers to release the door lock, movement of the fingers until the door gripping section is gripped is not smooth. Therefore, there is a risk that the side door cannot be fully prevented from opening unexpectedly and suddenly due to a strong wind or gravity.

Accordingly, one embodiment of the present invention provides an inside door handle structure where movement of fingers from pulling an inside door handle to release a door lock to gripping a door gripping section can be smoothly made.

An inside door handle structure according to a first aspect includes: an opening recess formed in a recessed shape in an armrest of a door trim at a side door of a vehicle, the opening recess opening toward a vehicle upper side, and a part of the armrest acting as a door gripping section when fingers are inserted into the opening recess in a case in which the side door is opened or closed; and an inside door handle provided in the door trim at the vehicle upper side of the opening recess, an end section of the inside door handle at a vehicle front side being configured as a rotational fulcrum, and the inside door handle releasing a door lock of the side door.

Due to the inside door handle structure according to the first aspect, an opening recess is formed on a vehicle lower side of an inside door handle, the inside door handle has an end section of the inside door handle at a vehicle front side, as a rotational fulcrum, and a part of the armrest acting as a door gripping section when fingers are inserted into the opening recess in a case in which a side door is opened or closed. Therefore, it becomes possible for an occupant to move their fingers to the vehicle lower side of the inside door handle immediately after having pulled the inside door handle by their fingers to release a door lock, and it becomes possible for the occupant to grip the door gripping section with their fingers. In other words, due to one embodiment of the present invention, movement of the fingers from pulling the inside door handle to release the door lock to gripping the door gripping section becomes smooth.

An inside door handle structure according to a second aspect is the inside door handle structure according to the first aspect, further including a housing recess formed in a recessed shape in the door trim at the vehicle upper side of the opening recess, the housing recess opening toward an inner side in a vehicle width direction, and the housing recess housing the inside door handle, wherein the housing recess and the opening recess are formed continuously.

Due to the inside door handle structure according to the second aspect, a housing recess housing the inside door handle and the opening recess are formed continuously. Therefore, movement of the fingers from pulling the inside door handle to release the door lock to gripping the door gripping section becomes smoother compared to a configuration where the housing recess and the opening recess are not formed continuously.

An inside door handle structure according to a third aspect is the inside door handle structure according to the second aspect, wherein an end section of the housing recess at a vehicle rear side and an end section of the opening recess at the vehicle rear side are disposed in the same position in a vehicle front-rear direction.

Due to the inside door handle structure according to the third aspect, an end section of the housing recess at a vehicle rear side and an end section of the opening recess at the vehicle rear side are disposed in the same position in a vehicle front-rear direction. Therefore, movement of the fingers from pulling the inside door handle to release the door lock to gripping the door gripping section becomes even smoother compared to a configuration where the end section of the housing recess at the vehicle rear side and the end section of the opening recess at the vehicle rear side are not disposed in the same position in the vehicle front-rear direction.

Due to the inside door handle structure according to the first aspect, movement of the fingers from pulling the inside door handle to release the door lock to gripping the door gripping section can be smoothly made.

Due to the inside door handle structure according to the second aspect, movement of the fingers from pulling the inside door handle to release the door lock to gripping the door gripping section can be more smoothly made.

Due to the inside door handle structure according to the third aspect, movement of the fingers from pulling the inside door handle to release the door lock to gripping the door gripping section can be even more smoothly made.

BRIEF DESCRIPTION OF THE DRAWINGS

Exemplary embodiments of the present invention will be described in detail based on the following figures, wherein:

FIG. 2 is a plan view showing the inside door handle structure according to the present embodiment;

FIG. 3 is a cross-sectional view showing the inside door handle structure according to the present embodiment;

DETAILED DESCRIPTION

An embodiment according to technology of the present disclosure will be described in detail below based on the drawings. Note that for convenience of explanation, an arrow UP, an arrow FR, and an arrow RH appropriately indicated in each of the drawings are assumed to be, respectively, a vehicle upward direction, a vehicle frontward direction, and a vehicle rightward direction. Moreover, in the description below, in cases in which directions of up/down, front/rear, and left/right are described, these are assumed to indicate up/down in a vehicle body up-down direction, front/rear in a vehicle body front-rear direction, and left/right in a vehicle body left-right direction (a vehicle body width direction), unless otherwise specifically stated. Moreover, each of these directions is a direction during a state of a side door 14 being closed.

Figure 1:
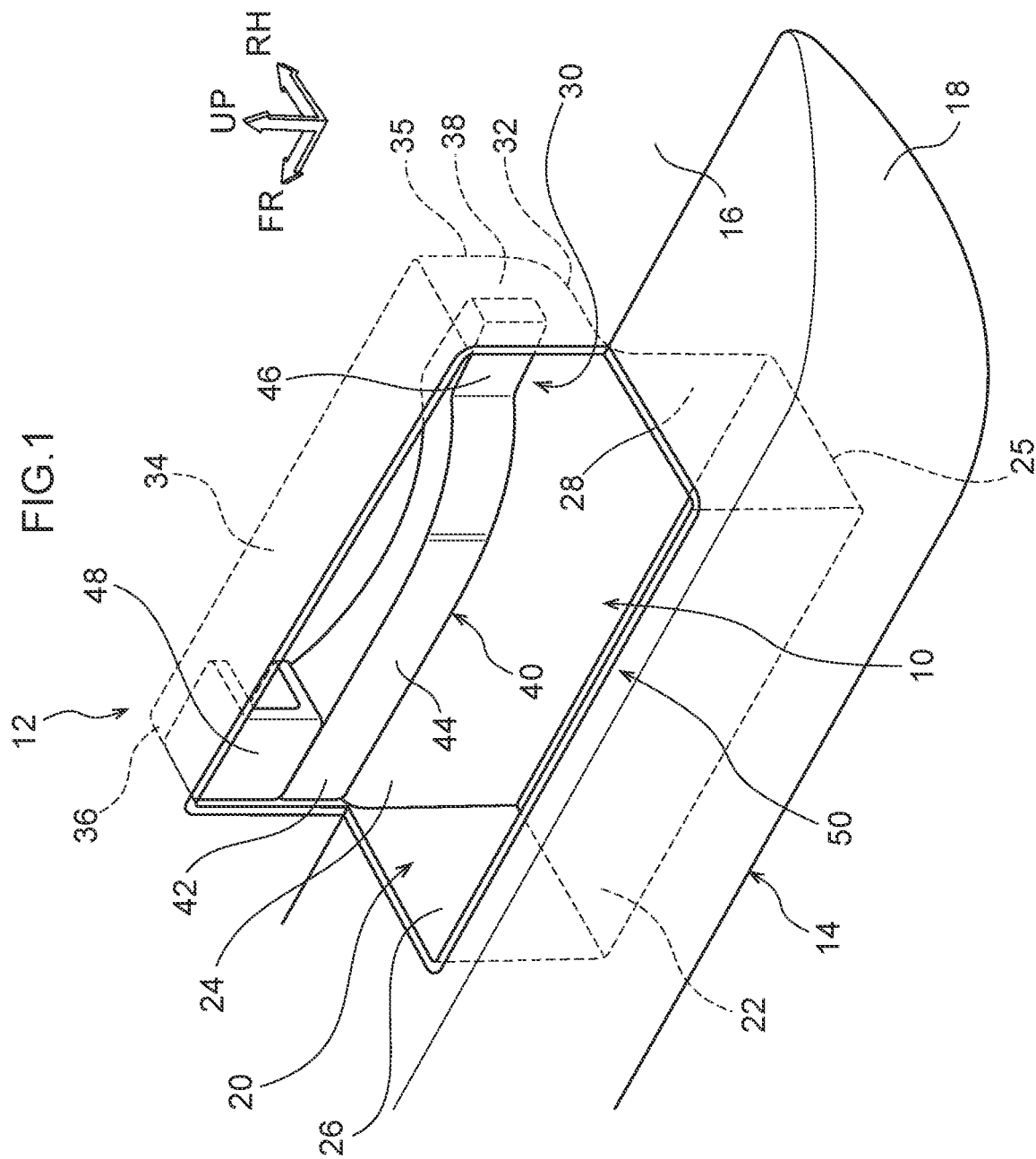
FIG. 1 is a perspective view showing an inside door handle structure according to the present embodiment.

As shown in FIGS. 1 to 3 as an example, an inside door handle structure 10 according to the present embodiment includes an opening recess 20 formed in a rectangular recessed shape opening toward a vehicle upper side, in an armrest 18 of a door trim 16 at the side door 14 of a vehicle 12. The opening recess 20 is a recess into which fingers of an occupant are inserted in a case in which the side door 14 is opened or closed, and has a configuration whereby the opening recess 20 results in part of the armrest 18 being a door gripping section 50 (refer to FIG. 4D).

Describing in detail, the opening recess 20 is configured by: an inner wall 22 disposed on an inner side in a vehicle width direction; an outer wall 24 disposed on an outer side in the vehicle width direction; a lower wall 25 disposed on a vehicle lower side; a front wall 26 disposed on a vehicle front side; and a rear wall 28 disposed on a vehicle rear side. Moreover, the door gripping section 50 that the occupant grips by their fingers is configured by the inner wall 22 that configures the opening recess 20 and part of the armrest 18 in a portion thereof more to an inner side in the vehicle width direction than the inner wall 22.

In addition, the inside door handle structure 10 according to the present embodiment includes a housing recess 30 formed in a rectangular recessed shape opening toward an inner side in the vehicle width direction, in the door trim 16 on the vehicle upper side of the opening recess 20. The housing recess 30 is configured by: a lower wall 32 disposed on the vehicle lower side; an upper wall 34 disposed on the vehicle upper side; an outer wall 35 disposed on an outer side in the vehicle width direction; a front wall 36 disposed on the vehicle front side; and a rear wall 38 disposed on the vehicle rear side.

Moreover, an inside door handle 40 for releasing a door lock of the side door 14 is housed rotatably having its vehicle front side end section (hereafter, called "front end section") 42 configured as a rotational fulcrum, in the housing recess 30, that is, in a space surrounded by the lower wall 32, the upper wall 34, the outer wall 35, the front wall 36, and the rear wall 38. Note that a mechanism by which the door lock of the side door 14 is released by operation of the inside door handle 40 is well-known, hence description thereof will be omitted.

The inside door handle 40 includes: the front end section 42 which is supported rotatably around a rotational axis running along a vehicle up-down direction; a holding section 44 that extends to the vehicle rear side from the front end section 42 and is held by the fingers of the occupant; and a guide section 46 that extends to the vehicle rear side from the holding section 44 and is to make it easy for the fingers of the occupant to be slipped away from the holding section 44.

As shown in FIG. 2 as an example, the holding section 44 is formed in a substantially circular arc shape projecting toward an inner side in the vehicle width direction in plan view, and the guide section is formed in a straight shape in plan view. A shape of this guide section 46 results in a configuration where after the occupant has pulled the inside door handle 40 toward an inner side in the vehicle width direction by their fingers (shown by an imaginary line), a comparatively wide gap D can be obtained between the guide section 46 and the outer wall 35 of the housing recess 30. In other words, the shape of this guide section 46 results in a configuration where the fingers of the occupant can be smoothly slipped away from the inside door handle 40.

Note that the inside door handle 40 is biased in a direction of being always housed in the housing recess 30 (toward the outer wall 35), by an unillustrated biasing member provided on a front end section 42 side. Therefore, the inside door handle 40 is configured to automatically return to an original position (a state of being housed in the housing recess 30) when the occupant detaches their fingers from the inside door handle 40.

Moreover, as shown in FIGS. 1 to 3 as an example, a lock member 48 for preventing the door lock of the side door 14 from being released even if the inside door handle 40 is pulled, is provided in the housing recess 30 on an upper side of the front end section 42 of the inside door handle 40. This lock member 48 has its vehicle front side end section supported by a rotational axis running along the vehicle up-down direction, and is configured capable of rotating around the rotational axis.

Note that a state of this lock member 48 being housed in the housing recess 30 (a state shown in FIGS. 1 to 3) is configured as a locked state in which door lock release by the inside door handle 40 is disabled, and a state of this lock member 48 being projected to an inner side in the vehicle width direction from within the housing recess 30 (a state shown in FIG. 4) is configured as a lock-released state in which door lock release by the inside door handle 40 is enabled. Moreover, a lock mechanism of the lock member 48 is well-known, hence description thereof will be omitted.

In addition, as shown in FIGS. 2 and 3 as an example, the inside door handle 40 (the front end section 42, the holding section 44, and the guide section 46) in a state of being housed in the housing recess 30 (a state of not being pulled frontwards to an inner side in the vehicle width direction) and the lock member 48 in the locked state have a configuration of not projecting toward an inner side in the vehicle width direction from the door trim 16 (the outer wall 24) in plan view and front cross-sectional view.

Moreover, as shown in FIGS. 1 and 3 as an example, the opening recess 20 of the armrest 18 and the housing recess 30 of the door trim 16 are formed continuously. In other words, there is no partitioning member or the like between the opening recess 20 and the housing recess 30, and a recess straddling the armrest 18 and the door trim 16 is formed integrally.

In addition, as shown in FIGS. 1 and 2 as an example, the rear wall 28 which is an end section of the opening recess 20 at a vehicle rear side and the rear wall 38 which is an end section of the housing recess 30 at the vehicle rear side are disposed in the same position in the vehicle front-rear direction. Moreover, the front wall 26 which is an end section of the opening recess 20 at the vehicle front side and the front wall 36 which is an end section of the housing recess 30 at the vehicle front side are disposed in the same position in the vehicle front-rear direction.

Note that in the present embodiment, the front wall 26 of the opening recess 20 and the front wall 36 of the housing recess 30 need not be disposed in the same position in the vehicle front-rear direction. That is, in the present embodiment, at least the rear wall 28 of the opening recess 20 and the rear wall 38 of the housing recess 30 should be disposed in the same position in the vehicle front-rear direction.

The inside door handle structure 10 provided with the above kind of configuration will next have its action described based mainly on FIGS. 4A, 4B, 4C, and 4D. Note that FIGS. 4A, 4B, 4C, and 4D show the case of opening the side door 14 on a front right side of the vehicle 12. Moreover, beforehand, the lock member 48 is pulled to an inner side in the vehicle width direction to be set to the lock-released state, and door lock release by the inside door handle 40 is enabled.

Figure 4A:
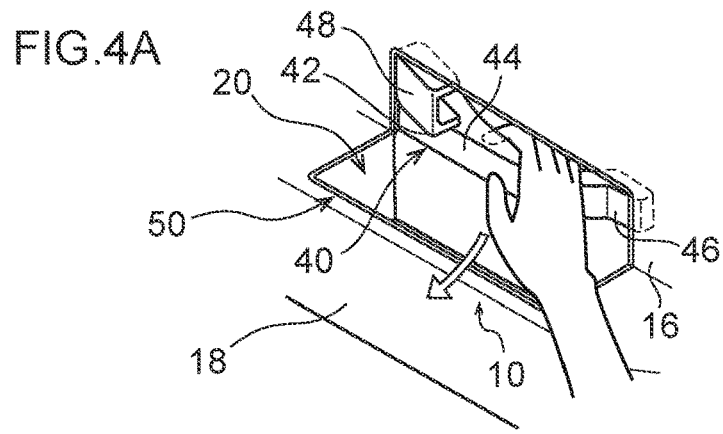
FIG. 4A is an explanatory view showing a first stage of movement of fingers of an occupant from an inside door handle to a door gripping section in the inside door handle structure according to the present embodiment.

As shown in FIG. 4A as an example, first, the occupant holds the holding section 44 of the inside door handle 40 by their fingers, and with the front end section 42 as a rotational fulcrum, pulls the holding section 44, against a biasing force, frontwards to an inner side in the vehicle width direction. As a result, the inside door handle 40 rotates frontwards to an inner side in the vehicle width direction around the front end section 42, and the door lock of the side door 14 is released.

Figure 4B:
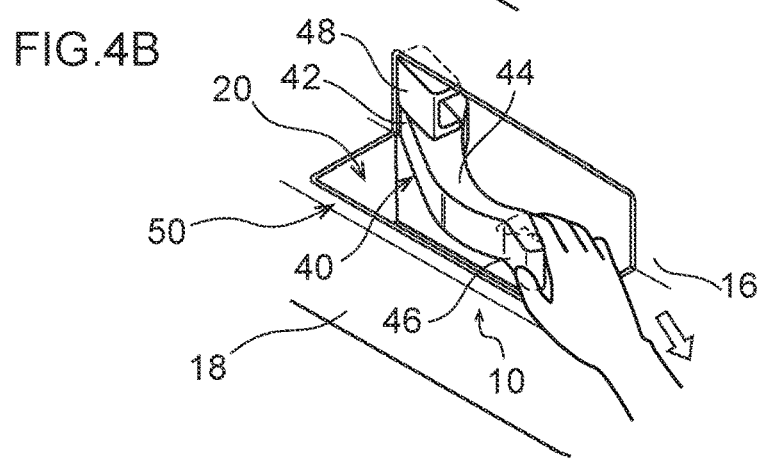
FIG. 4B is an explanatory view showing a second stage of movement of the fingers of the occupant from the inside door handle to the door gripping section in the inside door handle structure according to the present embodiment.

Next, as shown in FIG. 4B as an example, the occupant moves their fingers to the guide section 46 (to the vehicle rear side) from the holding section 44 of the inside door handle 40. Now, the guide section 46 is formed in a straight shape, and as shown by the imaginary line in FIG. 2, the comparatively wide gap D can be obtained between the guide section 46 and the outer wall 35 of the housing section 30. Therefore, the fingers of the occupant can smoothly slip away from the inside door handle 40 along the guide section 46.

Figure 4C:
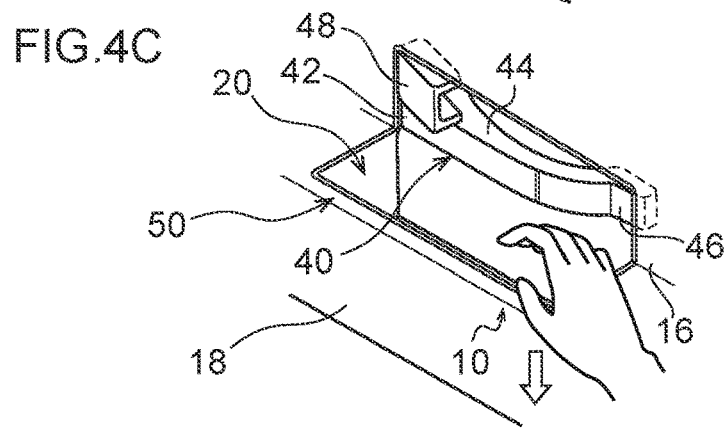
FIG. 4C is an explanatory view showing a third stage of movement of the fingers of the occupant from the inside door handle to the door gripping section in the inside door handle structure according to the present embodiment.
Figure 4D:
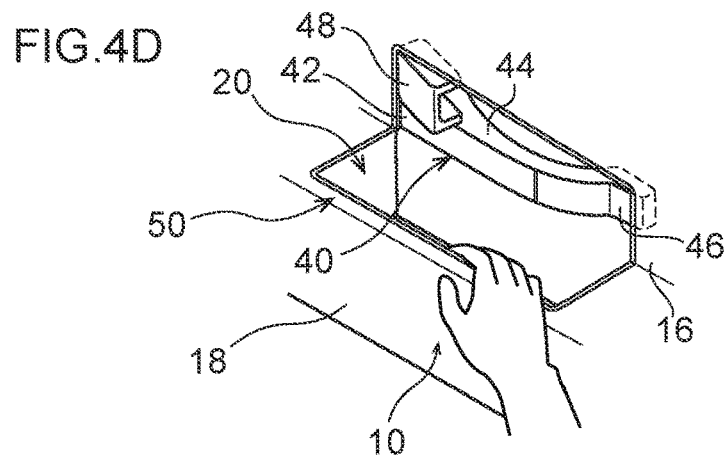
FIG. 4D is an explanatory view showing a fourth stage of movement of the fingers of the occupant from the inside door handle to the door gripping section in the inside door handle structure according to the present embodiment.

As shown in FIG. 4C as an example, in a case in which the fingers of the occupant slip away from the inside door handle 40, the inside door handle 40 rotates in a reverse direction with the front end section 42 as a rotational fulcrum and returns to the original position, due to the biasing force of the biasing member. Then, the fingers of the occupant can move smoothly (without once moving to the vehicle upper side) to the door gripping section 50 formed by the opening recess 20 provided on the vehicle lower side of the inside door handle 40, and as shown in FIG. 4D as an example, can promptly grip the door gripping section 50.

In this way, due to the inside door handle structure 10 according to the present embodiment, it becomes possible for the occupant to move their fingers to the vehicle lower side of the inside door handle 40 immediately after having pulled the inside door handle 40 by their fingers to release the door lock, and it becomes possible for the occupant to grip the door gripping section 50 by their fingers. In other words, movement of the fingers from pulling the inside door handle 40 to release the door lock to gripping the door gripping section 50 can be smoothly made.

Therefore, it is possible to prevent occurrence of a shortcoming such as the side door 14 ending up opening unexpectedly and suddenly due to a strong wind or gravity immediately after the occupant has pulled the inside door handle 40 to release the door lock in a case in which the occupant gets out of the vehicle 12 during a strong wind or when the occupant gets out of the vehicle 12 that has been stopped on a downslope, and so on.

Moreover, because the housing recess 30 housing the inside door handle 40 and the opening recess 20 are formed continuously, movement of the fingers from pulling the inside door handle 40 to release the door lock to gripping the door gripping section 50 can be more smoothly made compared to a configuration where the housing recess 30 and the opening recess 20 are not formed continuously.

Moreover, particularly because the rear wall 38 of the housing recess 30 and the rear wall 28 of the opening recess 20 are disposed in the same position in the vehicle front-rear direction, movement of the fingers from pulling the inside door handle 40 to release the door lock to gripping the door gripping section 50 can be even more smoothly made compared to a configuration where the rear wall 38 of the housing recess 30 and the rear wall 28 of the opening recess 20 are not disposed in the same position in the vehicle front-rear direction.

Moreover, in a case in which movement of the fingers of the occupant from the inside door handle 40 to the door gripping section 50 becomes smooth and operation in a case in which opening the side door 14 is simplified in this way, a work space for the fingers can be reduced. Therefore, the inside door handle structure 10 according to the present embodiment can contribute also to a spacious feeling of a vehicle interior space.

The inside door handle structure 10 according to the present embodiment has been described above based on the drawings. However, the inside door handle structure 10 according to the present embodiment is not limited to that of the drawings and may undergo appropriate design changes in a range not departing from the spirit of the present invention. For example, the guide section 46, provided it does not project toward an inner side in the vehicle width direction from the door trim 16, may have its rear end section side bent slightly toward an inner side in the vehicle width direction, in the plan view shown in FIG. 2.

In addition, the housing recess 30 need not be formed in the door trim 16. However, it is preferable in terms of design that there be adopted a configuration in which the housing recess 30 housing the inside door handle 40 and the lock member 48 is formed in the door trim 16 and the inside door handle 40 and the lock member 48 are in a state of not projecting toward an inner side in the vehicle width direction from the door trim 16.

Moreover, provided movement of the fingers of the occupant from the inside door handle 40 to the door gripping section 50 can be smoothly made, the housing recess 30 and the opening recess 20 need not be formed continuously, and the rear wall 38 of the housing recess 30 and the rear wall 28 of the opening recess 20 need not be disposed in the same position in the vehicle front-rear direction.

All of the documents, patent applications, and technical standards described in the present specification are incorporated by reference in the present specification to the same degree as if what was incorporated by reference by the individual documents, patent applications, and technical standards was specifically and individually described.

What is claimed is:

1. An assembly structure of an inside door handle and an arm rest for use with a vehicle, the assembly structure comprising:
    an opening recess formed in a recessed shape in an armrest of a door trim at a side door of the vehicle, the opening recess opening toward a vehicle upper side, and a part of the armrest being configured as a door gripping section when fingers are inserted into the opening recess in a case in which the side door is opened or closed;
    an inside door handle provided in the door trim at the vehicle upper side of the opening recess, an end section of the inside door handle at a vehicle front side being configured as a rotational fulcrum, and the inside door handle releasing a door lock of the side door; and
    a housing recess formed in a recessed shape in the door trim at the vehicle upper side of the opening recess, the housing recess opening toward an inner side in a vehicle width direction, and the housing recess housing the inside door handle, wherein:
    the opening recess and the housing recess each exist on a separate plane, and the separate planes are transverse or perpendicular to each other, and
    the opening recess and the housing recess are formed continuously.

2. The assembly structure according to claim 1, wherein an end section of the housing recess at a vehicle rear side and an end section of the opening recess at the vehicle rear side are disposed at the same position in a vehicle front-rear direction.

3. The assembly structure according to claim 1, wherein an outer wall of the opening recess is connected to an outer wall of the housing recess by a lower wall of the housing recess.

* * * * *